(12) United States Patent
Yacoub

(10) Patent No.: US 8,453,434 B2
(45) Date of Patent: Jun. 4, 2013

(54) METHOD FOR ADAPTING AN SCR CATALYTIC CONVERTER IN AN EXHAUST SYSTEM OF A MOTOR VEHICLE

(75) Inventor: Yasser Mohamed sayed Yacoub, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 51 days.

(21) Appl. No.: 13/267,756

(22) Filed: Oct. 6, 2011

(65) Prior Publication Data

US 2012/0096837 A1 Apr. 26, 2012

(30) Foreign Application Priority Data

Oct. 21, 2010 (DE) .......................... 10 2010 060 099

(51) Int. Cl.
*F01N 3/00* (2006.01)
(52) U.S. Cl.
USPC ................ 60/286; 60/274; 701/103; 701/115
(58) Field of Classification Search
USPC .................... 60/274, 286; 701/103, 106, 109, 701/114, 115
See application file for complete search history.

(56) References Cited

U.S. PATENT DOCUMENTS

| 7,559,194 | B2* | 7/2009 | Westerberg ..................... 60/286 |
| 2003/0005683 | A1* | 1/2003 | Lambert et al. ................. 60/276 |
| 2009/0272101 | A1* | 11/2009 | Wills et al. ...................... 60/286 |
| 2009/0301066 | A1* | 12/2009 | Sindano et al. ................. 60/286 |
| 2010/0024389 | A1* | 2/2010 | Gady et al. ...................... 60/274 |
| 2010/0024390 | A1* | 2/2010 | Wills et al. ...................... 60/274 |
| 2010/0050611 | A1 | 3/2010 | Walz et al. |
| 2010/0058740 | A1* | 3/2010 | Kurtz ............................. 60/286 |
| 2010/0107609 | A1* | 5/2010 | Parmentier et al. ............. 60/286 |
| 2010/0122524 | A1* | 5/2010 | Solbrig ........................... 60/285 |
| 2010/0223907 | A1* | 9/2010 | Walde et al. .................... 60/274 |

FOREIGN PATENT DOCUMENTS

| DE | 10347132 A1 | 6/2004 |
| WO | 2009024622 A2 | 2/2009 |

* cited by examiner

*Primary Examiner* — Thomas Denion
*Assistant Examiner* — Jason Shanske
(74) *Attorney, Agent, or Firm* — Julia Voutyras; Alleman Hall McCoy Russell & Tuttle LLP

(57) ABSTRACT

A method for adapting a kinetic model of a SCR is described. In one example, the kinetic model is adapted for stored ammonia, ammonia release rate, and ammonia storage capacity. The method may be useful for adjusting engine control parameters for the purpose of reducing engine emissions.

20 Claims, 10 Drawing Sheets

METHOD FOR ADAPTING AN SCR CATALYTIC CONVERTER IN AN EXHAUST SYSTEM OF A MOTOR VEHICLE

RELATED APPLICATIONS

This application claims priority to German Patent Application No. 102010060099.7, titled "Method for Adapting an SCR Catalytic Converter in an Exhaust System of a Motor Vehicle," filed Oct. 21, 2010, the entire contents of which are herein incorporated by reference for all purposes.

FIELD

The present description relates to a method for adapting an SCR catalytic converter in an exhaust system of a motor vehicle.

BACKGROUND AND SUMMARY

An SCR (Selective Catalytic Reduction) catalytic converter reduces the oxides of nitrogen by means of a reducing agent. As reducing agent, use is usually made of ammonia ($NH_3$) or urea which is injected directly into the exhaust-gas flow upstream of the catalytic converter. Furthermore, the injected ammonia can be stored in the catalytic converter at low temperatures, which ammonia is then desorbed at high temperatures. In contrast, at relatively high temperatures of the substrate, the efficiency of the NOx conversion is determined substantially by the molecular ratio of ammonia to NOx at the inlet to the SCR catalytic converter.

The ammonia can be dosed, in aqueous solution, directly into the exhaust-gas flow above the SCR catalytic converter. The maximum storage capacity for the ammonia is dependent substantially on the size and the design of the SCR catalytic converter and on its temperature. Both the ammonia slippage downstream of the SCR catalytic converter and also the level of converted NOx are subject to disturbances caused by errors in the modeling of the ammonia storage level in the catalytic converter and also by uncertainty in the NOx emissions upstream. Further imponderables arise in that the actual level of injected ammonia cannot be determined exactly on account of contamination of the injection nozzle, and in that depositions of $NH_3$ may occur in the exhaust line. Thus, uncertainties can affect NOx and ammonia estimates.

The present description may improve the efficiency of the conversion of SCR catalytic converters. Said improvement may be achieved according to the description by way of the features of the claims.

The inventor herein has recognized the above-mentioned limitations and has developed a method for adapting an SCR catalytic converter for a vehicle exhaust system, comprising: supplying an adaptation signal to a kinetic model and adapting an amount of stored reducing agents via of the adaptation signal, and adapting a reducing agent release amount via of a remainder of the adaptation signal, and adapting a total rate of a reducing agent storage via a storage adaptation rate generated from subtraction of the reducing agent release amount from the adaptation signal, conversion of a reducing agent concentration into a mass throughput, division by the maximum storage capacity and sign reversal; and adjusting an engine actuator in response to the stored amount of reducing agents, the reducing agent release amount, or the total rate of reducing agent storage.

By providing individual adaptation of stored reductants, reductant release rate, and reductant storage rate, it may be possible to improve output of a kinetic module that tracks reductant storage and use in a vehicle exhaust system. In one example, the reductant storage and usage may be determined via NOx sensors positioned upstream and downstream of an emissions device such as a SCR so that transient changes in reductant and NOx can be considered and accounted. Engine actuators such as fuel injectors and EGR valves may be adjusted in response to reductants so that increased engine emissions may be avoided.

The present description may provide several advantages. Specifically, the approach may reduce engine emissions via improving estimation of ammonia stored and consumed in an exhaust system. Further, the approach may be useful for reducing the amount of ammonia used in an exhaust system to reduce NOx. Further still, the approach may help to reduce emissions of ammonia from a vehicle via providing an improved estimate of ammonia stored in a SCR.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

The drawings included herein serve merely for the explanation of the description, and do not restrict the description. The drawings and the individual parts are not necessarily drawn to scale. The reference symbols that are common to more than one figure are used to denote identical or similar parts between different figures.

DETAILED DESCRIPTION

Figure 1:
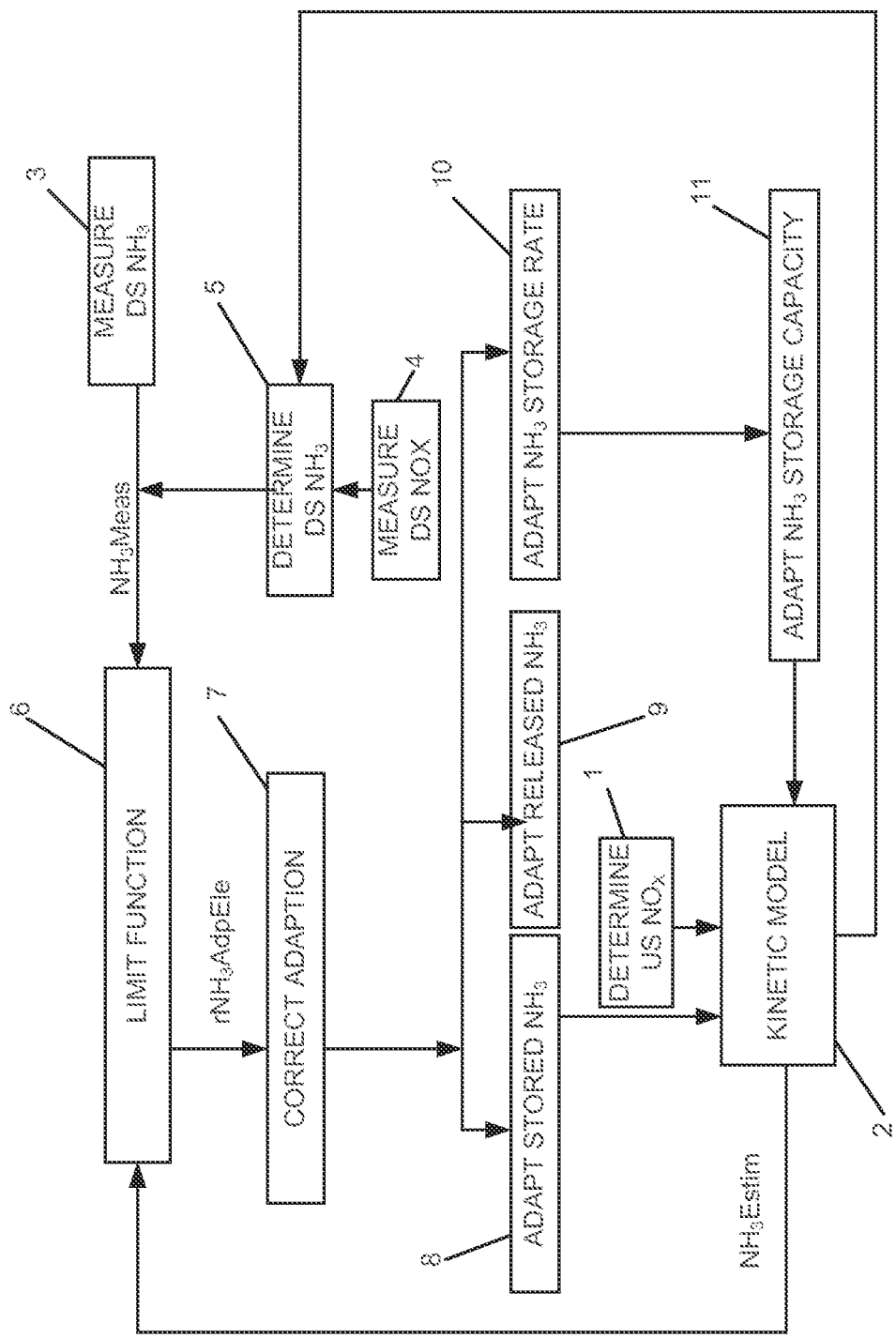
FIG. 1 shows a flowchart of a method for adapting a SCR catalytic converter in an exhaust system of a motor vehicle.
Figure 3:
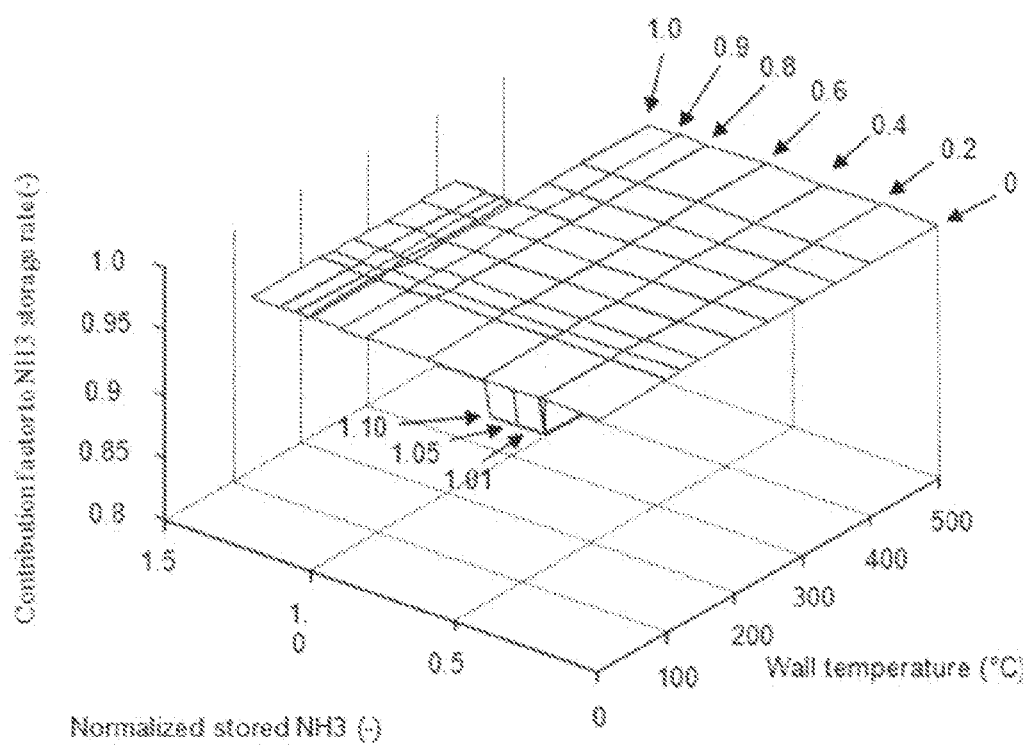
FIG. 3 shows a diagram of an adaption factor for reducing agent release.
Figure 4:
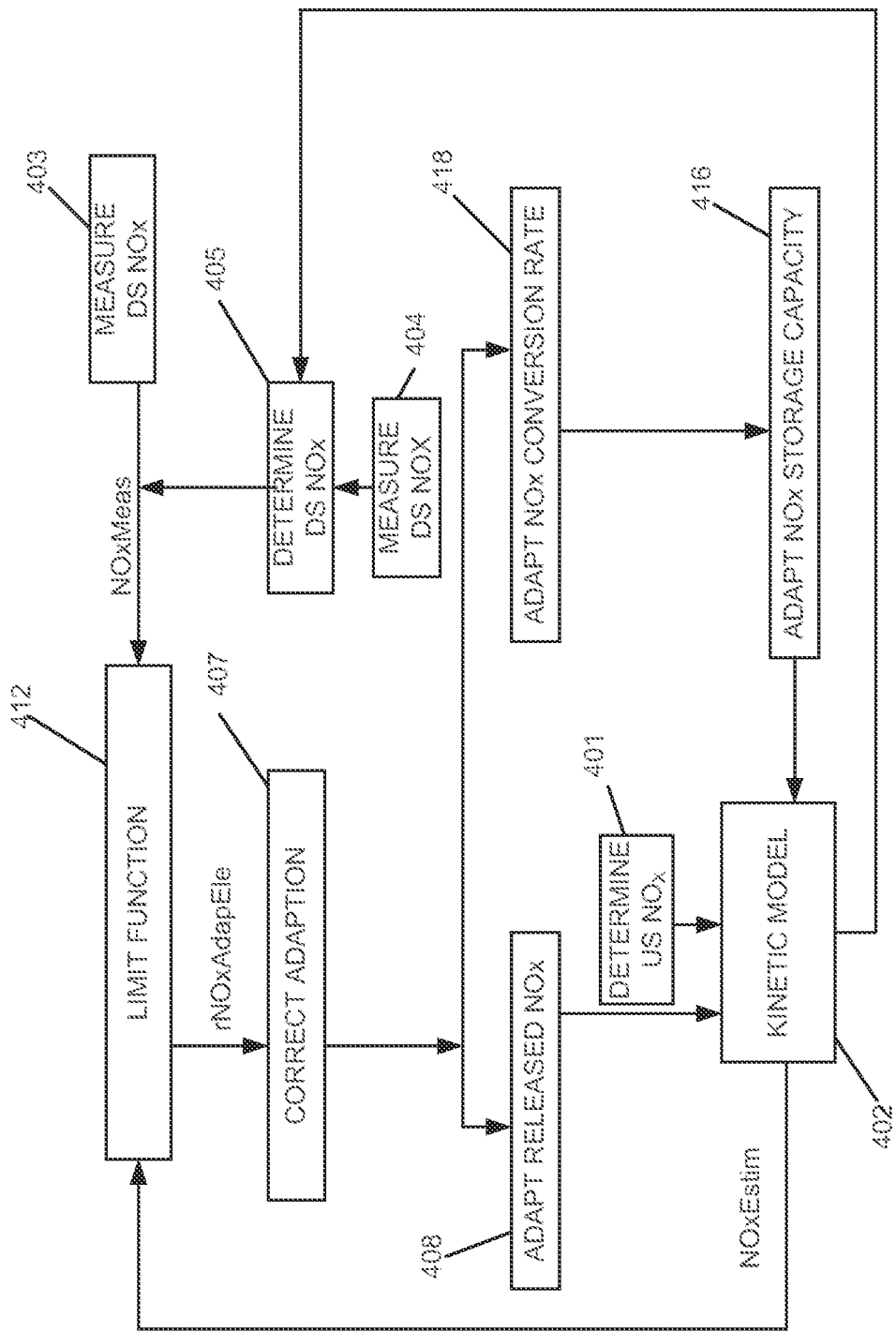
FIG. 4 shows a flowchart for adaptation of NOx conversion.
Figure 5:
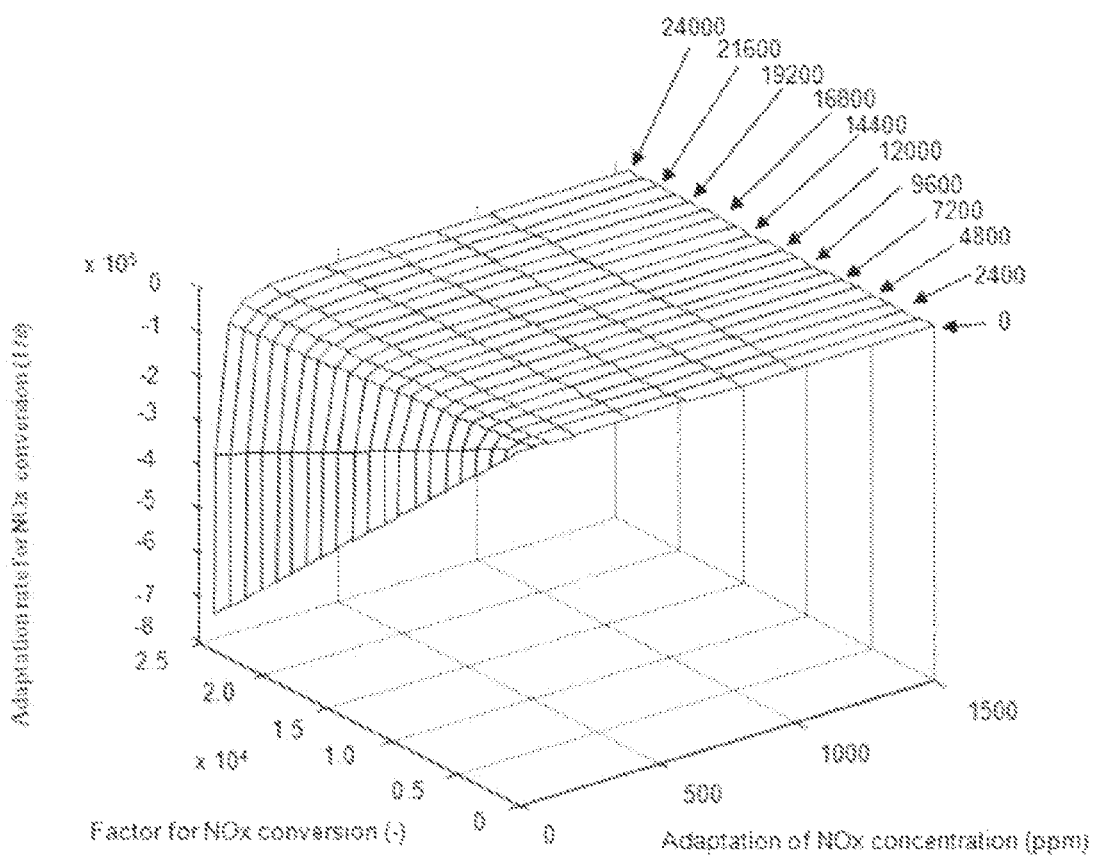
FIG. 5 shows a diagram of an adaptation factor for NOx conversion.

The present description is related to determining ammonia storage and use in an engine exhaust system. The method is described in FIGS. 1-3. Further, NOx release and conversion are described in FIGS. 4-5. FIG. 5 illustrates an example catalyst model where ammonia storage and NOx conversion may be determined. Simulated results of the methods of FIGS. 1 and 4 are provided in FIGS. 7-9. Finally, FIG. 10 shows an example system where the method of FIGS. 1 and 4 may be implemented via instructions executable via a controller.

According to a first aspect of the description, a method for adapting an SCR catalytic converter in an exhaust system of a motor vehicle comprises the following steps: determining the amount of nitrogen oxides (NOx) upstream of the catalytic converter; calculating the amount of reducing agent stored in the catalytic converter and estimating an estimated NOx concentration downstream and an estimated reducing agent concentration downstream of the catalytic converter by means of a kinetic model of the catalytic converter; determining a reducing agent concentration downstream of the catalytic converter; calculating a limit function on the basis of the reducing agent concentration downstream and the amount of nitrogen oxides upstream; calculating an adaptation signal by subtraction of the estimated reducing agent concentration downstream from the limit function; supplying the adaptation signal to the kinetic model and/or; adapting the amount of stored reducing agents by means of the adaptation signal and/or; adapting the reducing agent release by means of the remaining adaptation signal and/or; adapting the total rate of the reducing agent storage by means of a storage adaptation rate generated by subtraction of the reducing agent release from the adaptation signal, conversion of a concentration into a mass throughput, division by the maximum storage capacity and sign reversal, and/or; improving the estimation of the mass of stored reducing agents by means of a storage adaptation generated by integration of the storage adaptation rate, generation of a factor therefrom, and multiplication by the nominal total storage capacity.

The description proposes an algorithm which is based on the NOx concentration and/or the reducing agent concentration (for example $NH_3$) downstream of the catalytic converter and which provides a cascaded adaptation of the model. By processing the NOx concentration and/or the reducing agent concentration downstream of the catalytic converter, the mass of the reducing agent stored in the catalytic converter can be adapted and the degree of aging of the catalytic converter can be determined, which can be identified from the deterioration in the maximum storage capacity of the catalytic converter. This method permits robust real-time control. As a result of the cascading, that is to say the repeated relaying and use of the residuum or of the remaining adaptation signal, the latter is in a sense utilized multi-dimensionally, which permits particularly good adaptation of the reaction.

The amount of nitrogen oxides upstream of the catalytic converter may be determined using an estimation model and/or a sensor arranged upstream. An estimation model already provides reliable values. The determination can be further improved by means of a sensor.

The estimated NOx concentration downstream and/or the estimated reducing agent concentration downstream may be subjected to a time delay and/or filtered using a low-pass filter. The time delay may take into consideration the propagation time to the position of the sensor downstream, while the low-pass filtering takes into consideration the time constant of the sensor model. Said measures permit improved modeling.

The reducing agent concentration downstream may be measured. A direct measurement permits a reliable measurement value without calculation expenditure, but may require a dedicated sensor.

The reducing agent concentration downstream may be calculated by means of a measured NOx concentration downstream and a measured or estimated NOx concentration upstream. Said variant dispenses with a dedicated sensor for the reducing agent concentration. Processing expenditure is required merely to determine the reducing agent concentration downstream from already existing NOx sensors or estimated values. The processing capacity required for this purpose is normally provided in a control computer or the like.

The limit function may have a minimum limit and a maximum limit. By means of two limits, the limit function can be adapted simply and precisely to the respective circumstances.

The adaptation signal may be calculated if the estimated reducing agent concentration downstream lies outside the limit function, and the adaptation signal may be set equal to zero if the estimated reducing agent concentration downstream lies within the limit function. The method can be simplified by means of this specification because the differential signal is calculated only when actually necessary.

The adaptation signal may be corrected with regard to the wall temperature and/or the lambda value of the exhaust gas. This makes the method more accurate and robust.

A rate of the thermal stability of the catalytic converter may be detected, and the storage adaptation rate may be set equal to zero for large temperature gradients. In the case of large temperature gradients such as may arise during start-up and shut-down processes, precise modeling may not be possible under some circumstances. Said short time periods are therefore not taken into consideration in the modeling.

The storage adaptation may be utilized for a diagnosis of the exhaust system if the value of the storage adaptation is below a defined threshold. An impending failure of the catalytic converter may thus be diagnosed. This increases the reliability of the operation of the after treatment components.

A one-dimensional model with a plurality of cells in the axial direction may be provided for the catalytic converter, wherein the adaptation signal is applied to the final cell and wherein the remaining adaptation signal runs over in a stepped fashion to the next cells situated upstream. Four cells may be used, which constitute a fourth order thermal/kinetic model. The adaptation signal is applied firstly to the final cell, and the remaining adaptation signal then runs over to the next cell situated upstream. This is repeated up to the first cell, that is to say the cell situated first in the downstream direction. A residual adaptation signal which runs over from the first cell may then be used for the storage adaptation rate and the storage adaptation.

A NOx adaptation signal may be calculated by subtraction of the estimated NOx concentration downstream from a certain NOx concentration downstream and/or the NOx release in the gas may be calculated by means of the NOx adaptation signal and/or an adaptation rate of the NOx conversion may be calculated by means of the NOx adaptation signal and/or an adaptation factor for the NOx conversion may be calculated by means of the adaptation rate of the NOx conversion and/or the adaptation factor for the NOx conversion may be supplied to the kinetic model of the catalytic converter. According to said implementation, an adaptation signal for the reducing agent and a NOx adaptation signal are calculated and used multiple times. As a result of the use of two modeling branches, that is to say the adaptation for the reducing agent and the NOx adaptation, the method may be made even more precise and more reliable. The two branches may be executed in parallel, in an interleaved manner or in succession.

A one-dimensional model with a plurality of cells in the axial direction may be provided for the catalytic converter, wherein the NOx adaptation signal is applied to the first cell and wherein the remaining adaptation signal runs over in a stepped fashion to the next cells situated downstream. Four cells may be used, which constitute a fourth order thermal/kinetic model. The adaptation signal is applied firstly to the first cell, and the remaining adaptation signal then runs over to the next cell situated downstream. This is repeated up to the final cell, that is to say the cell situated last in the downstream direction.

Referring now to FIG. 1, a flow diagram of the method for the adaptation of reducing agents for an SCR catalytic converter is shown. Here, as a catalyst, use is made by way of example of $NH_3$.

At 1, the amount of nitrogen oxides (NOx) and the amount of injected ammonia upstream of the catalytic converter are determined. This may take place using an estimation model. Alternatively or in addition, a sensor arranged upstream of the catalytic converter may be used. Furthermore, at 1, the amount of injected ammonia upstream of the catalytic converter is calculated by means of the injected urea. For example, a pressure of $NH_3$ supplied to the injector as well as an injector open or on time may index a transfer function that outputs mass of $NH_3$ injected to determine injected $NH_3$ or urea.

The value is supplied to a kinetic model 2 which models the catalytic converter or at least a part thereof. By way of the kinetic model 2, firstly the amount of $NH_3$ stored in the catalytic converter is calculated. Secondly, in the kinetic model 2, an estimated $NH_3$ concentration $NH_3Estim$ and an estimated NOx concentration NOxEstim downstream of the catalytic converter are estimated.

The estimated $NH_3$ concentration downstream $NH_3Estim$ and the estimated NOx concentration downstream NOxEstim are subjected to a time delay and filtered using a low-pass filter in order to adapt the concentration determined in the kinetic model 2 to the actual conditions in the exhaust system. The delay thus takes into consideration the transport delay to a sensor position downstream, and the low-pass filtering takes into consideration the time constant of the sensor. The time-delayed and low-pass-filtered estimated $NH_3$ concentration downstream is output by the kinetic model 2 as $NH_3Estim$.

If $NH_3$ directly downstream of the catalytic converter is measured (e.g., at 3), said value is used. Otherwise, if NOx downstream is measured (e.g., at 4), the determination of the $NH_3$ concentration downstream is calculated as a function of the measured NOx downstream and the measured and/or estimated NOx upstream of the catalytic converter (e.g., at 5). Said determination or calculation of $NH_3$ downstream may be referred to as an indirect measurement.

For the calculation of $NH_3$ at 5, one of the following two approaches is used. Firstly, the ammonia may be calculated by subtraction of the estimated NOx value (if appropriate after delay and filtering) from the NOx signal since the NOx signal may be provided via a NOx sensor that is sensitive to both NOx and $NH_3$. Said approach may be selected in order to allow for uncertainties in the estimation of NOx and the accuracy of the NOx sensor and if reaction to the $NH_3$ concentration is sensitive.

Secondly, the ammonia may be calculated by subtraction of the NOx upstream from the measured NOx value downstream, wherein this is limited to a minimum value of zero. Therefore, for a positive signal, the ammonia slippage within the accuracy of the sensor and within the ammonia sensitivity, which was allowed for in the above calculation, is determined.

The $NH_3$ concentration downstream either directly measured at 3 or indirectly measured at 5 is output as $NH_3Meas$ and supplied to 6. The estimated $NH_3$ concentration downstream $NH_3Estim$ determined at 2 is likewise supplied to 6.

Next, at 6, a limit function is calculated on the basis of the measured $NH_3$ concentration downstream $NH_3Meas$ and the NOx concentration upstream. The limit function has a minimum limit and a maximum limit, which may be referred to as $NH_3$ limits.

If the estimated $NH_3$ concentration downstream $NH_3Meas$ lies between the minimum and maximum limits, or in other words lies within the limit function, an $NH_3$ adaptation signal $rNH_3AdapEle$ is set equal to zero. Alternatively, an adaptation of the $NH_3$ concentration at 7, which is downstream of 6, is set equal to zero.

Otherwise, that is to say if the estimated $NH_3$ concentration downstream $NH_3Estim$ lies outside the limit function or beyond the minimum and maximum limits, the adaptation signal $rNH_3AdapEle$ is generated in the form of a differential signal. For this purpose, the estimated $NH_3$ concentration downstream $NH_3Estim$ is subtracted from the limit function.

For the limit function, the relevant, that is to say minimum or maximum, limit is used. The relevant limit is the limit closest to the measured $NH_3$ concentration downstream $NH_3Meas$. A special situation may be one in which the measured $NH_3$ concentration downstream $NH_3Meas$ is equal or is set equal to the limit function. This may be the case for example if the values are actually identical or if for example the limit value is selected in order to simplify the method.

The $NH_3$ adaptation signal $rNH_3AdapEle$ may be calculated according to the following formula:

$$rNH_3AdapEle = NH_3Meas - NH_3Estim$$

The peculiarities in the use of the limit function or the measured $NH_3$ concentration downstream $NH_3Meas$ have already been explained. Correspondingly, for the calculation of the $NH_3$ adaptation signal $rNH_3AdapEle$, the limit function or the relevant limit may be used instead of the measured $NH_3$ concentration downstream $NH_3Meas$.

Furthermore, at 7, the $NH_3$ adaptation signal $rNH_3AdapEle$ is corrected with regard to the wall temperature of the catalytic converter and/or with regard to the mass throughput of the exhaust gas. The dependence on the wall temperature and on the mass throughput is used to adapt the intensity of the adaptation to preferred kinetics of the $NH_3$ after treatment. The corrected $NH_3$ adaptation signal $rNH_3AdapEle$ is then designated, and output, as adaptation of the $NH_3$ concentration.

Both designations are used, both the designation $NH_3$ adaptation signal $rNH_3AdapEle$ and also the designation adaptation of the $NH_3$ concentration. Both designations may be used as equal designations and/or in the sense that the designation adaptation of the $NH_3$ concentration corresponds to the corrected $NH_3$ adaptation signal $rNH3AdapEle$, wherein said correction is optional.

The $NH_3$ adaptation signal $rNH_3AdapEle$ or the adaptation of the $NH_3$ concentration is then interpreted and used in numerous ways, and supplied directly and/or indirectly to the kinetic model 2, in the subsequent steps.

Figure 2:
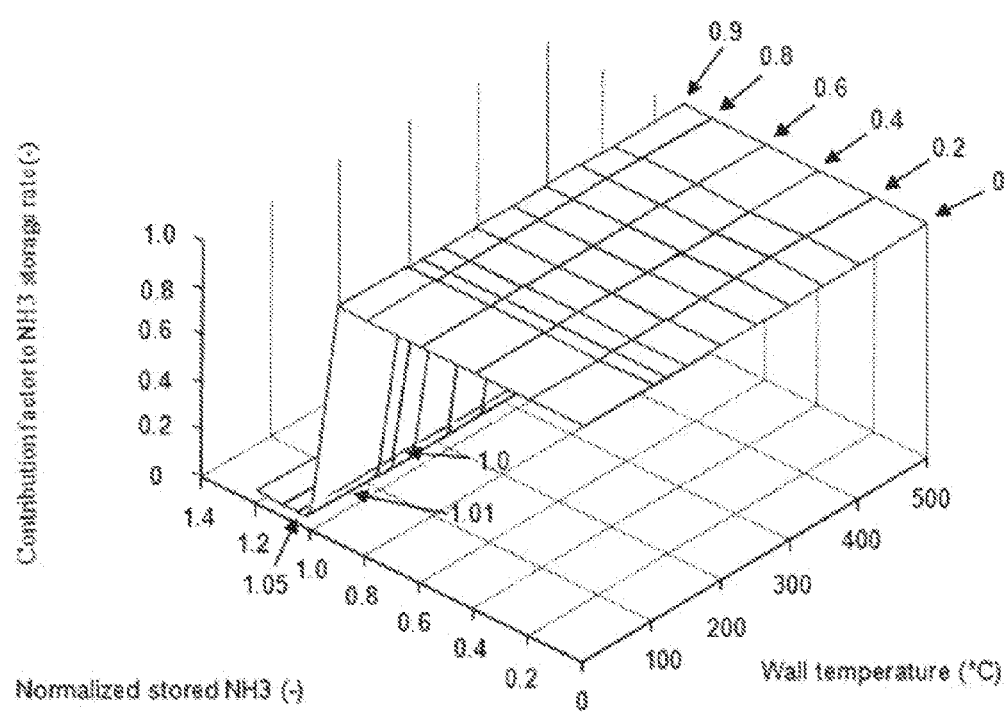
FIG. 2 shows a diagram of an adaptation factor for an amount of stored reducing agents.

At 8, the amount of stored or converted $NH_3$ is adapted by means of the $NH_3$ adaptation signal $rNH_3AdapEle$. A contribution which directly corrects the mass of stored $NH_3$ is shown in FIG. 2. This is the dominating factor for normalized stored $NH_3$ between zero and one. If the measured $NH_3$ limit is higher than the estimated $NH_3$ value, the adaptation correction consists in an increase in the value of stored $NH_3$. In the reverse situation, the value of stored $NH_3$ is reduced. The adaptation of the amount of stored or converted $NH_3$ is then transmitted to the kinetic model 2 in order to improve the latter.

At 9, the $NH_3$ release is adapted by means of the remaining $NH_3$ adaptation signal. The remaining $NH_3$ adaptation signal is calculated by subtraction of one minus the adaptation factor or contribution for the $NH_3$ storage from 8. The remaining $NH_3$ adaptation signal is then multiplied by an adaptation factor for the $NH_3$ release, which substantially directly corrects the $NH_3$ in the exhaust-gas flow. This is limited as a function of the estimated amount of $NH_3$ upstream, on account of the uncertainty in the estimation or measurement. As shown in FIG. 3, said contribution is reduced if the normalized stored $NH_3$ is greater than one and high levels of preferably over approximately 300° C. prevail for the wall temperature.

At 10, the $NH_3$ release calculated in block 9 is subtracted from the $NH_3$ adaptation signal and converted from a concentration into a mass throughput. This is then divided by the maximum storage capacity and, with a sign reversal, a storage adaptation rate (1/s) is generated. The storage adaptation rate is then used together with the mass of stored $NH_3$ to generate the adaptation of the total rate of the $NH_3$ storage. Furthermore, a rate of the thermal stability of the catalytic converter is detected and the storage adaptation rate is deactivated or set equal to zero for large temperature gradients.

Finally, at 11, said storage adaptation rate of the entire $NH_3$ storage is integrated, wherein initialization to a value of one takes place. From this, a factor is generated, and said factor is multiplied by the nominal total storage capacity, as calculated for a new catalytic converter and modified for the thermal aging and the amount of stored reducing agents, in order to generate a storage adaptation or an adaptation of the total $NH_3$ storage capacity. Said value is then used to improve the estimation of the mass of stored $NH_3$. Furthermore, the value is fed back to the kinetic model 2.

Furthermore, the storage adaptation may be used for a diagnosis of the exhaust system or of the NOx aftertreatment if the value of the storage adaptation lies below a defined threshold, which is an indication of a used catalytic converter which has come to the end of its expected service life. By means of the proposed method, the correct degree of aging of the SCR catalytic converter can be determined from the reduction in the maximum storage capacity.

Additionally, engine actuators may be adjusted in response to the stored amount of reducing agents, the reducing agent release amount, the total rate of reducing agent storage, and the reducing agent storage capacity. For example, an opening amount of an EGR valve may be increased when the stored amount of reducing agent is less than a threshold amount so as to reduce NOx produced by the engine so that engine NOx may be reduced until the amount of stored or injected reductant is increased. In another example, a start of injection timing of a fuel injector may be retarded to limit engine NOx production. In these ways, operation of the engine may be adjusted depending on reductant storage and reductant utilization.

The above-described elements at 7, 8, 9, 10 and 11 may optionally be carried out, as a result of which the accuracy of the method is improved. Elements at 7, 8, 9, 10 and 11 may be carried out in succession and, where possible, also in parallel.

FIG. 4 illustrates a flow diagram for the adaptation of the NOx conversion. The adaptation of the NOx conversion may be carried out in parallel with the $NH_3$ adaptation or in a time-delayed manner with respect thereto.

At 401, as in FIG. 1, the amount of nitrogen oxides NOx and the amount of injected ammonia upstream of the catalytic converter are determined. The measured values are supplied to a kinetic model at 402. In this case, consideration will be given to a NOx conversion part of the kinetic model at 402. It is also alternatively possible to use two kinetic models, with one being used for the $NH_3$ adaptation and the other being used for the NOx adaptation.

In the kinetic model at 402, an estimated $NH_3$ concentration and an estimated NOx concentration NOxEstim downstream of the catalytic converter are estimated. The estimated NOx concentration downstream NOxEstim and the estimated $NH_3$ concentration downstream are subjected to a time delay and filtered using a low-pass filter in order to adapt the concentration determined in the kinetic model at 402 to the actual conditions in the exhaust system. The delay thus takes into consideration the transport delay to a sensor position downstream, and the low-pass filtering takes into consideration the time constant of the sensor. The time-delayed and low-pass-filtered estimated NOx concentration downstream is output by the kinetic model at 402, as NOxEstim, to 412.

As a further value, a measured NOx value downstream NOxMeas is output to 412. The measured NOx value downstream NOxMeas may be either measured directly downstream of the catalytic converter (at 403) or measured indirectly (at 405). In the case of the indirect measurement or determination of the measure NOx value downstream NOxMeas, use is made of the $NH_3$ concentration downstream from 402 and/or a collective measurement of NOx and $NH_3$ downstream of the catalytic converter (at 404).

In block 412, a NOx adaptation signal rNOxAdapEle is calculated. For this purpose, use is made of a limit function which has upper and lower limits and which is calculated as a function of the NOx concentration upstream and the measured NOx concentration downstream, wherein this is compensated with the adapted ammonia concentration downstream. Said compensation is carried out substantially by virtue of the ammonia concentration for a cross-sensitivity of the NOx sensor being corrected and subtracted from the measured signal. The NOx adaptation signal rNOxAdapEle may be calculated according to the following formula:

$$rNOxAdapEle = NOxMeas - NOxEstim$$

The calculation of the NOx adaptation signal rNOxAdapEle takes place substantially analogously to the calculation of the $NH_3$ adaptation signal rNH3AdapEle as per 6 in FIG. 1.

At 407, the NOx adaptation signal rNOxAdapEle is corrected with regard to the wall temperature of the catalytic converter and/or further values such as for example the lambda value. The corrected NOx adaptation signal rNOxAdapEle is then designated, and output, as adaptation of the NOx concentration.

Both designations are used, both the designation NOx adaptation signal rNOxAdapEle and also the designation adaptation of the NOx concentration. Both designations may be used as equal designations and/or in the sense that the designation adaptation of the NOx concentration corresponds to the corrected NOx adaptation signal rNOxAdapEle, wherein said correction is optional.

The NOx adaptation signal rNOxAdapEle or the adaptation of the NOx concentration is then interpreted and used in numerous ways, and supplied directly and/or indirectly to the kinetic model at 402, in the subsequent steps.

At 408, the NOx release is adapted by means of the NOx adaptation signal rNOxAdapEle. For this purpose, the NOx adaptation signal rNOxAdapEle is multiplied by an adaptation factor for the NOx release, which substantially directly corrects the NOx in the exhaust-gas flow. This may be limited as a function of the estimated amount of nitrogen oxides upstream, on account of the uncertainty in the estimation or measurement. Said signal is subsequently used for the calculation of the converted nitrogen oxides. Said contribution may be reduced if the normalized stored nitrogen oxides are greater than one and the value of lambda is greater than one.

The NOx adaptation signal rNOxAdapEle is then used to calculate an adaptation rate of the NOx conversion at 418. Said calculation is a function of the basic conversion (before the adaptation) and the NOx concentration upstream (e.g., FIG. 5), which is then multiplied by the contribution of the NOx adaptation signal rNOxAdapEle. The contribution of the NOx adaptation signal is calculated as a factor multiplied by the total NOx adaptation signal. Said contribution factor is such that it is set to zero for a low basic conversion (before the adaptation). This means that no adaptation of the conversion is calculated, and the NOx adaptation signal rNOxAdapEle is passed on to form a gas concentration downstream.

Furthermore, the contribution factor in block 416 is corrected as a function of the NOx adaptation signal and a total adaptation factor for the NOx conversion. Here, the contribution factor is set to zero for a saturation at a minimum, for example at a value of 0.1, of the total adaptation factor for the NOx conversion (calculated by integration of the adaptation rate of the NOx conversion) and for a NOx adaptation rate of greater than zero or for the maximum, for example at a value of 2.0, and for a NOx adaptation of less than zero. The corrected contribution factor is fed back to the kinetic model at 402 in order to further improve the modeling.

Figure 6:
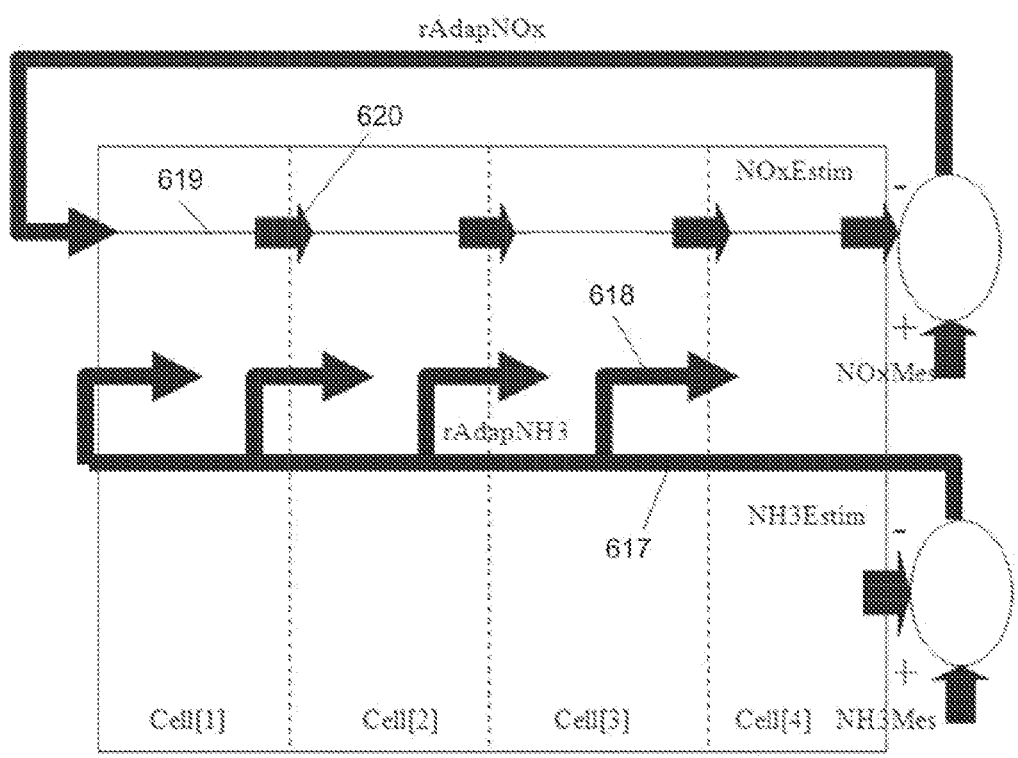
FIG. 6 shows a diagram of a one-dimensional adaptation signal flow for NOx and $NH_3$ adaptation.

FIG. 6 shows a one-dimensional model of the catalytic converter. The catalytic converter is divided into a number of cells in the axial direction. Here, four cells 1 to 4 are used, which corresponds to a fourth order thermal or kinetic model. The cell 1 is situated furthest upstream, whereas the cell 4 is arranged furthest downstream. Said model of the catalytic converter is a constituent part of the kinetic model at 2 and 402.

The $NH_3$ adaptation signal rNH$_3$AdapEle is applied to the final cell, that is to say cell 4, from where the remaining $NH_3$ adaptation signal runs over to the next cell situated upstream, in this case cell 3. The $NH_3$ adaptation signal rNH$_3$AdapEle is thus passed through the cells of the catalytic converter in the direction of the arrow 617, such that it runs from cell 3 into cell 2 and from there into cell 1. The profile of the estimated $NH_3$ is illustrated by means of the arrows 618. The $NH_3$ flows in the direction of the exhaust gas through the catalytic converter, that is to say from the cell 1 in the direction of the cell 4. The estimated reducing agent or $NH_3$ concentration downstream NH$_3$Estim then emerges, as an estimated result, from the cell 4 and is used with the measured or determined $NH_3$ concentration downstream NH$_3$Meas in order to calculate the $NH_3$ adaptation signal rNH$_3$AdapEle. This describes the regulating circuit for the $NH_3$ adaptation.

In addition to the $NH_3$ adaptation, the NOx adaptation in the catalytic converter is modeled. The NOx adaptation signal rNOxAdapEle is applied to the first cell, that is to say the cell 1 situated furthest upstream, from where the remaining NOx adaptation signal runs over to the next cell situated downstream, in this case cell 2. The NOx adaptation signal rNOxAdapEle is thus passed through the cells of the catalytic converter in the direction of the arrow 619. The profile of the estimated NOx is illustrated by means of the arrows 620. The NOx flows in the direction of the exhaust gas through the catalytic converter, that is to say from the cell 1 in the direction of the cell 4. The estimated reducing agent or NOx concentration downstream NOxEstim then emerges, as an estimated result, from the cell 4 and is used with the measured or determined NOx concentration downstream NOxMeas in order to calculate the NOx adaptation signal rNOxAdapEle. This describes the regulating circuit for the NOx adaptation.

Results of the proposed method will be discussed on the basis of FIGS. 7 to 9. The diagrams shown are based on temperatures and mass throughput under continuous output conditions of the engine and on a stepped injection of urea.

Figure 7:
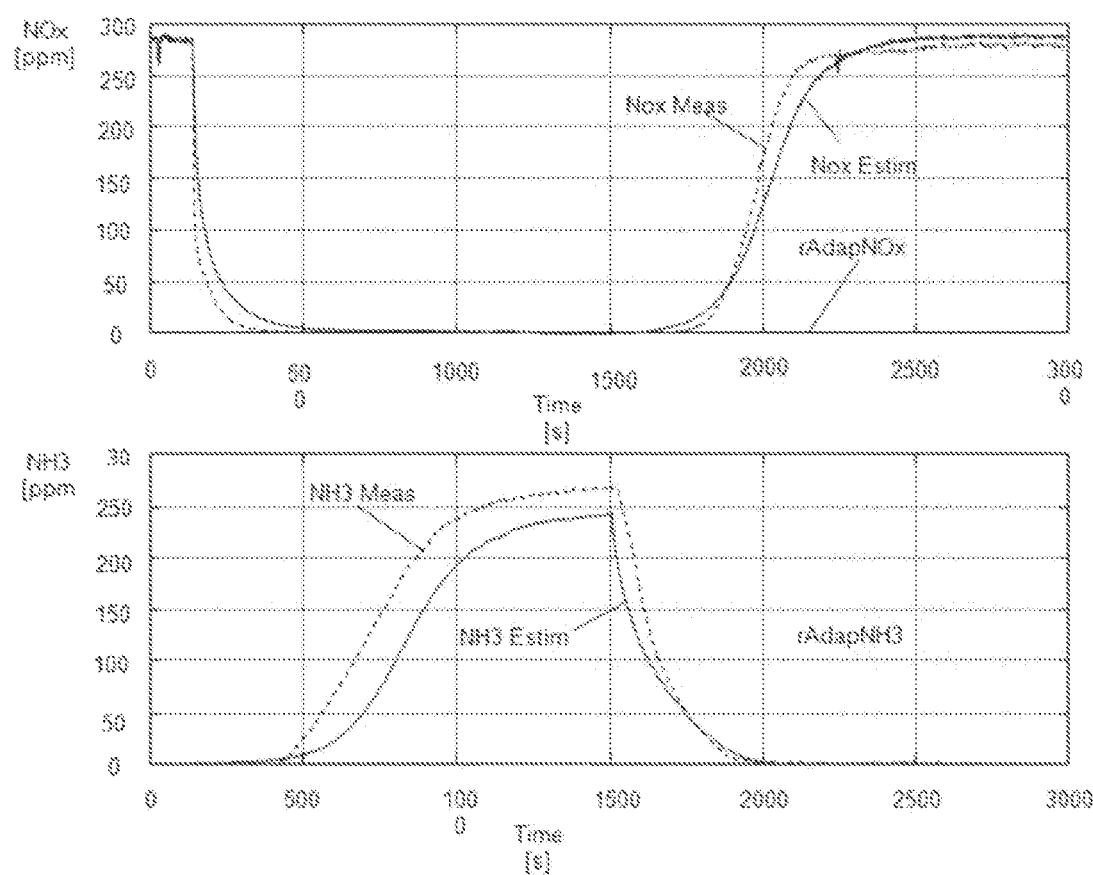
FIG. 7 shows a diagram for comparison of NOx and $NH_3$ slippage between estimated and measurement without adaptation.
Figure 8:
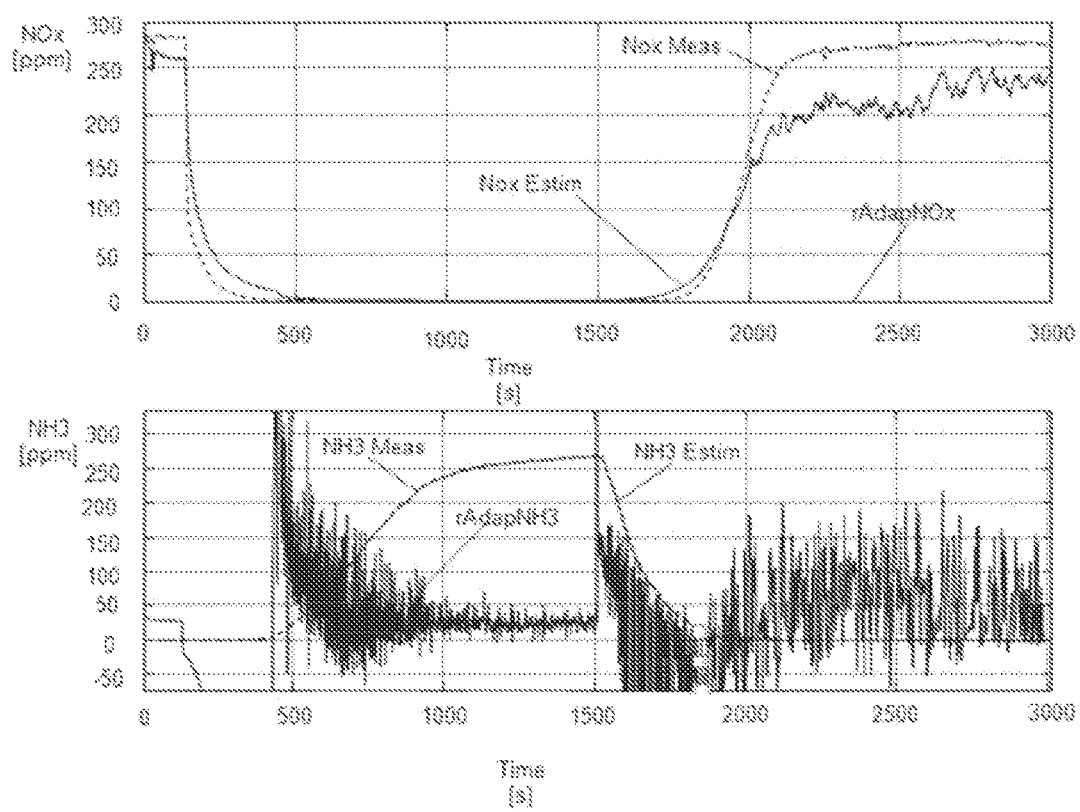
FIG. 8 shows a diagram for comparison of NOx and $NH_3$ slippage between estimation and measurement with $NH_3$ adaptation using a $NH_3$ sensor.
Figure 9:
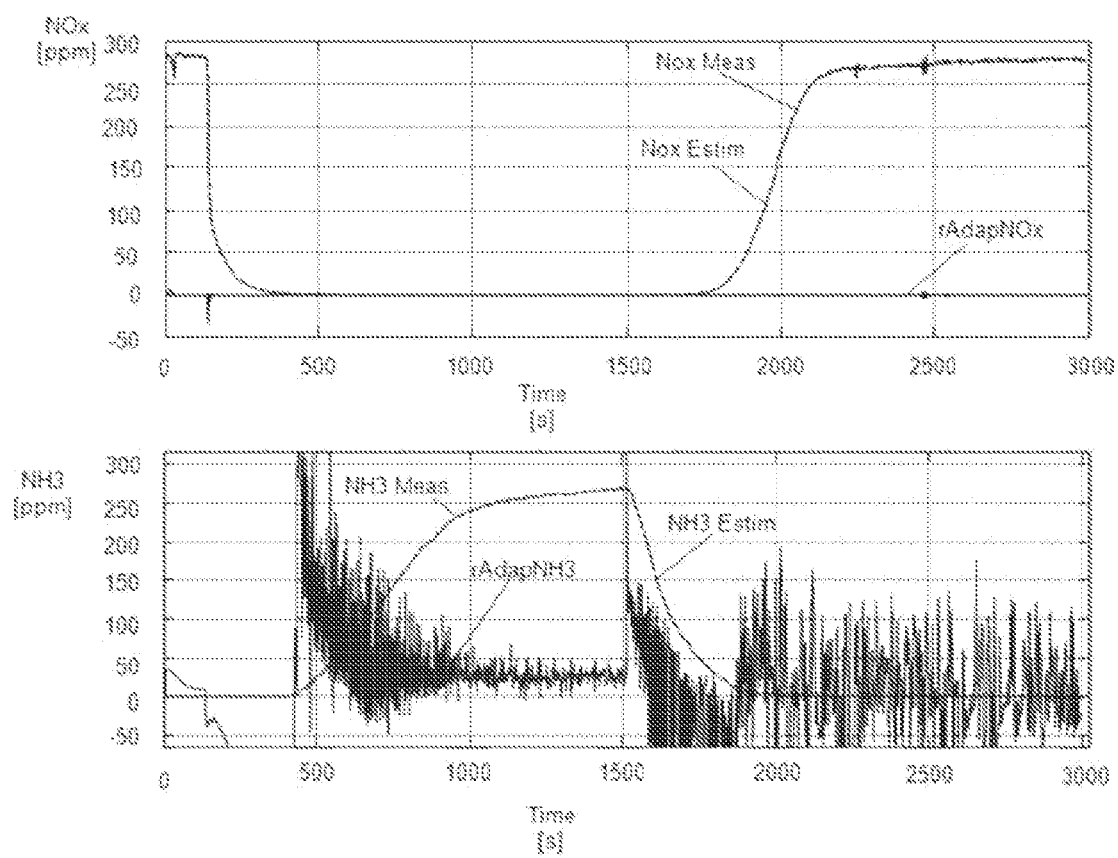
FIG. 9 shows a diagram for the comparison of NOx and $NH_3$ slippage between estimation and measurement with $NH_3$ adaptation using a $NH_3$ sensor and with NOx adaptation using a NOx sensor.
Figure 10:
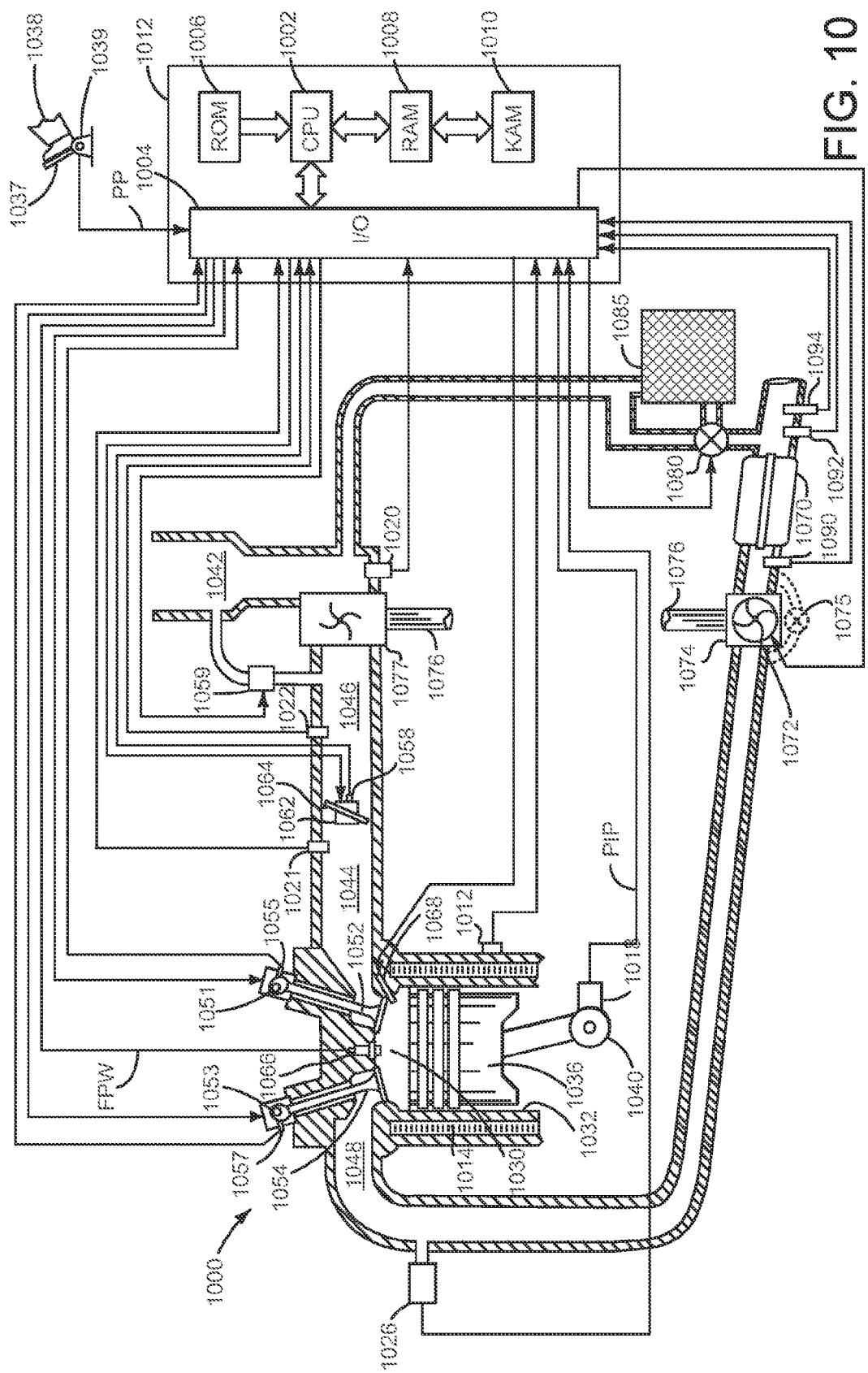
FIG. 10 shows an example after treatment system coupled to an engine.

The upper diagram in each case in FIGS. 7 to 9 shows the NOx concentration versus the time, whereas the lower diagram in each case in the figures shows the $NH_3$ concentration versus the time. Each diagram shows three curves, specifically the corresponding measured value, the corresponding estimated value and the corresponding adaptation factor. The diagrams show the NOx slippage and the $NH_3$ slippage, or the deviation between the estimation and the measurement of the NOx concentration and of the $NH_3$ concentration.

FIG. 7 shows the situation in which no adaptation is carried out, that is to say, neither a NOx adaptation nor an $NH_3$ adaptation occurs. Correspondingly, in both diagrams, the respective adaptation signal rNOxAdapEle or rNH$_3$AdapEle is zero. In the upper diagram for the NOx values, it can be clearly seen that the estimated NOx signal NOxEstim has a slower increase behavior than, and overshoots, the measured signal NOxMeas. From the lower diagram for the $NH_3$ values, it can be seen that the estimated $NH_3$ signal NH$_3$Estim is subjected to a time delay and does not reach the full amplitude.

FIG. 8 shows the case of an $NH_3$ adaptation using an $NH_3$ sensor. In the upper diagram for the NOx adaptation, little has changed in relation to FIG. 7, because here only an $NH_3$ adaptation is carried out. In the lower diagram for the $NH_3$ adaptation, it is then possible to see clear changes in relation to FIG. 7. The curve NH$_3$Estim is virtually congruent with the curve NH$_3$Meas, and the slippage is thus equal to zero or very small, which shows the effectiveness of the adaptation method. Only at the start of the measurement do small deviations occur in the region of the transient response. The profile of the adaptation signal rNH$_3$AdapEle reflects the state of the regulating circuit.

FIG. 9 shows the case of a NOx adaptation using a NOx sensor and an $NH_3$ adaptation using an $NH_3$ sensor. Now, in the upper diagram for the NOx adaptation, the curves NOxEstim and NOxMeas are also virtually congruent, and the slippage is thus equal to zero or very small, which shows the effectiveness of the adaptation method. Only at the start of the measurement do small deviations occur in the region of the transient response. The profile of the adaptation signal rNOxAdapEle reflects the state of the regulating circuit. In relation to the $NH_3$ adaptation, it can be seen here that the NOx adaptation signal rNOxAdapEle has fewer and smaller deflections than the $NH_3$ adaptation signal rNH$_3$AdapEle. The lower diagram for the $NH_3$ adaptation from FIG. 9 corresponds substantially to the lower diagram of FIG. 8.

Thus, the methods of FIGS. 1 and 4 provide for A method for adapting an SCR catalytic converter for a vehicle exhaust system, comprising: supplying an adaptation signal to a kinetic model and adapting an amount of stored reducing agents via of the adaptation signal, adapting a reducing agent release amount via of a remainder of the adaptation signal, and adapting a total rate of a reducing agent storage via a storage adaptation rate generated from subtraction of the reducing agent release amount from the adaptation signal, conversion of a reducing agent concentration into a mass throughput, and division by the maximum storage capacity and a sign reversal; and adjusting an engine actuator in response to the stored amount of reducing agents, the reducing agent release amount, or the total rate of reducing agent storage. In this way, attributes related to a reductant (e.g., ammonia) can be estimated and adapted so as to reduce engine emissions and improve operation of engine actuators In one example, the method further comprises improving an estimation of a mass of stored reducing agents via a storage adaptation generated via integration of the storage adaptation rate and multiplication by a nominal total storage capacity. The method includes where the engine actuator is an EGR valve so that NOx emissions may be reduced. The method further comprises increasing an opening amount of the EGR valve when the stored amount of reducing agent is less than a threshold amount. In some examples, the method includes where the engine actuator is a fuel injector. The method further comprises where the start of fuel injection timing of the fuel injector is retarded when the stored amount of reducing agents is less than a threshold amount.

In another example, the methods of FIGS. 1 and 4 provide for adapting an SCR catalytic converter for a vehicle exhaust system, comprising: determining an amount of nitrogen oxides upstream of the SCR catalytic converter; calculating an amount of reducing agent stored in the SCR catalytic converter and a NOx concentration downstream of the SCR catalyst and a reducing agent concentration downstream of the SCR catalytic converter via a kinetic model of the SCR catalytic converter; determining a reducing agent concentration downstream of the SCR catalytic converter; calculating a limit function on the basis of the reducing agent concentration downstream of the SCR catalytic converter and the amount of nitrogen oxides upstream of the SCR catalytic converter; calculating an adaptation signal via subtraction of the reducing agent concentration downstream of the SCR catalytic converter from the limit function; supplying the adaptation signal to the kinetic model and adapting the amount of reducing agent stored in the SCR catalytic converter via the adaptation signal, and adapting a reducing agent release via a remainder of the adaptation signal, and adapting a total rate of the reducing agent storage in the SCR catalytic converter via a storage adaptation rate generated from subtraction of the reducing agent release from the adaptation signal, conversion of a reducing agent concentration into a mass throughput, division by a maximum storage capacity and a sign reversal, and improving an estimation of a mass of stored reducing agents via a storage adaptation generated by integration of the storage adaptation rate, generation of a factor therefrom, and multiplication of a nominal total storage capacity.

In some examples, the method includes where the amount of nitrogen oxides upstream of the SCR catalytic converter is determined using an estimation model or a sensor arranged upstream of the SCR catalytic converter. Further, the method includes where the NOx concentration downstream of the SCR catalytic converter and the reducing agent concentration downstream of the SCR catalytic converter are subjected to a time delay and filtered with a low-pass filter. The method includes where the reducing agent concentration downstream of the SCR catalytic converter is measured via a NOx sensor downstream of the SCR catalytic converter and a NOx sensor upstream of the SCR catalytic converter. The method also includes where the limit function has a minimum limit and a maximum limit.

In still other examples, the method includes where the adaptation signal is calculated when the reducing agent concentration downstream of the SCR catalytic converter lies outside the limit function, and wherein the adaptation signal is set equal to zero when the reducing agent concentration downstream of the SCR catalytic converter lies within the limit function. The method also includes where the adaptation signal is corrected with regard to a wall temperature and a lambda value of an engine exhaust gas. The method further includes where a rate of thermal stability of the SCR catalytic converter is detected and the storage adaptation rate is set equal to zero for large temperature gradients.

Referring now to FIG. 10, internal combustion engine 1000, comprising a plurality of cylinders, one cylinder of which is shown in FIG. 10, is controlled by electronic engine controller 1012. Engine 1000 includes combustion chamber 1030 and cylinder walls 1032 with piston 1036 positioned therein and connected to crankshaft 1040. Combustion chamber 1030 is shown communicating with intake manifold 1044 and exhaust manifold 1048 via respective intake valve 1052 and exhaust valve 1054. Each intake and exhaust valve may be operated by an intake cam 1051 and an exhaust cam 1053. The position of intake cam 1051 may be determined by intake cam sensor 1055. The position of exhaust cam 1053 may be determined by exhaust cam sensor 1057.

Fuel injector 1066 is shown positioned to inject fuel directly into combustion chamber 1030, which is known to those skilled in the art as direct injection. Fuel injector 1066 delivers fuel in proportion to the pulse width of signal FPW from controller 1012. Fuel is delivered to fuel injector 1066 by a fuel system (not shown) including a fuel tank, fuel pump, fuel rail (not shown). Fuel pressure delivered by the fuel system may be adjusted by varying a position valve regulating flow to a fuel pump (not shown). In addition, a metering valve may be located in or near the fuel rail for closed loop fuel control. A pump metering valve may also regulate fuel flow to the fuel pump, thereby reducing fuel pumped to a high pressure fuel pump.

Intake manifold 1044 is shown communicating with optional electronic throttle 1062, and electronic throttle 1062 adjusts a position of throttle plate 1064 to control air flow from intake boost chamber 1046. Turbocharger compressor 162 which draws air from air intake inlet 1042 supplies air to boost chamber 1046. Exhaust gases spin turbine 164 which is coupled to compressor 162 via shaft 161. In some examples, a charge air cooler may be provided. Compressor speed may be adjusted via adjusting a position of variable vane control 1072 or compressor bypass valve 1059. In alternative examples, a waste gate 1075 may replace or be used in addition to variable vane control 1072. Exhaust gases can pass through turbine 1074 supplying little energy to rotate turbine 1074 when vanes are in an open position. Exhaust gases can pass through turbine 1074 and impart increased force on turbine 1074 when turbine vanes are in a closed position. Alternatively, wastegate 1075 allows exhaust gases to flow around turbine 1074 so as to reduce the amount of energy supplied to the turbine. Compressor bypass valve 1059 allows compressed air at the outlet of compressor 1077 to be returned to the inlet of compressor 1077. In this way, the efficiency of compressor 1077 may be reduced so as to affect the flow of compressor 1077 and reduce intake manifold pressure.

Combustion is initiated in combustion chamber 1030 when fuel automatically ignites as piston 1036 approaches top-dead-center compression stroke. In some examples, a universal Exhaust Gas Oxygen (UEGO) sensor 1026 may be coupled to exhaust manifold 1048 upstream of emissions device 1070. Alternatively, sensor 1026 may be a NOx sensor.

In other examples, the UEGO sensor may be located downstream of one or more exhaust after treatment devices. Further, in some examples, the UEGO sensor may be replaced by a NOx sensor that has both NOx and oxygen sensing elements.

At lower engine temperatures glow plug 1068 may convert electrical energy into thermal energy so as to raise a temperature in combustion chamber 1030. By raising temperature of combustion chamber 1030, it may be easier to ignite a cylinder air-fuel mixture via compression.

Emissions device 1070 can include a particulate filter and catalyst bricks, in one example. In another example, multiple emission control devices, each with multiple bricks, can be used. In other examples, the emissions device may include a lean NOx trap or a selective catalyst reduction (SCR), lean NOx trap (LNT), and/or a diesel particulate filter (DPF). NOx sensor 1090 is shown positioned upstream of emissions device 1070. NOx sensor 1092 is shown positioned downstream of emissions device 1070. In some examples, a $NH_3$ sensor 1094 may be provided downstream of emissions device 1070.

Exhaust gas recirculation (EGR) may be provided to the engine via EGR valve 1080. EGR valve 1080 is a three-way valve that closes or allows exhaust gas to flow from downstream of emissions device 1070 to a location in the engine air intake system upstream of compressor 1077. In alternative examples, EGR may flow from upstream of turbine 1074 to intake manifold 1044. EGR may bypass EGR cooler 1085, or alternatively, EGR may be cooled via passing through EGR cooler 1085. In other, examples high pressure and low pressure EGR system may be provided.

Controller 1012 is shown in FIG. 10 as a conventional microcomputer including: microprocessor unit 1002, input/output ports 1004, read-only memory 1006, random access memory 1008, keep alive memory 1010, and a conventional data bus. Controller 1012 is shown receiving various signals from sensors coupled to engine 1000, in addition to those signals previously discussed, including: engine coolant temperature (ECT) from temperature sensor 1012 coupled to cooling sleeve 1014; a position sensor 1039 coupled to an accelerator pedal 1037 for sensing accelerator position adjusted by foot 1038; a measurement of engine manifold pressure (MAP) from pressure sensor 1021 coupled to intake manifold 1044; boost pressure from pressure sensor 1022 exhaust gas oxygen concentration from oxygen sensor 1026; an engine position sensor from a Hall effect sensor 1018 sensing crankshaft 1040 position; a measurement of air mass entering the engine from sensor 1020 (e.g., a hot wire air flow meter); and a measurement of throttle position from sensor 1058. Barometric pressure may also be sensed (sensor not shown) for processing by controller 1012. In a preferred aspect of the present description, engine position sensor 1018 produces a predetermined number of equally spaced pulses every revolution of the crankshaft from which engine speed (RPM) can be determined.

During operation, each cylinder within engine 1000 typically undergoes a four stroke cycle: the cycle includes the intake stroke, compression stroke, expansion stroke, and exhaust stroke. During the intake stroke, generally, the exhaust valve 1054 closes and intake valve 1052 opens. Air is introduced into combustion chamber 1030 via intake manifold 1044, and piston 1036 moves to the bottom of the cylinder so as to increase the volume within combustion chamber 1030. The position at which piston 1036 is near the bottom of the cylinder and at the end of its stroke (e.g. when combustion chamber 1030 is at its largest volume) is typically referred to by those of skill in the art as bottom dead center (BDC).

During the compression stroke, intake valve 1052 and exhaust valve 1054 are closed. Piston 1036 moves toward the cylinder head so as to compress the air within combustion chamber 1030. The point at which piston 1036 is at the end of its stroke and closest to the cylinder head (e.g. when combustion chamber 1030 is at its smallest volume) is typically referred to by those of skill in the art as top dead center (TDC). In a process hereinafter referred to as injection, fuel is introduced into the combustion chamber. In some examples, fuel may be injected to a cylinder a plurality of times during a single cylinder cycle. In a process hereinafter referred to as ignition, the injected fuel is ignited by compression ignition resulting in combustion. During the expansion stroke, the expanding gases push piston 1036 back to BDC. Crankshaft 1040 converts piston movement into a rotational torque of the rotary shaft. Finally, during the exhaust stroke, the exhaust valve 1054 opens to release the combusted air-fuel mixture to exhaust manifold 1048 and the piston returns to TDC. Note that the above is described merely as an example, and that intake and exhaust valve opening and/or closing timings may vary, such as to provide positive or negative valve overlap, late intake valve closing, or various other examples. Further, in some examples a two-stroke cycle may be used rather than a four-stroke cycle.

Thus, the system of FIG. 10 provides for a system for adapting a SCR catalytic converter for a vehicle exhaust system, comprising: an engine; an exhaust system coupled to the engine, the exhaust system including a SCR catalytic converter; a first NOx sensor positioned upstream of the SCR catalytic converter; a second NOx sensor positioned downstream of the SCR catalytic converter; and a controller including instructions for supplying an adaptation signal to a kinetic model and adapting an amount of stored reducing agents via of the adaptation signal, adapting a reducing agent release amount via of a remainder of the adaptation signal, and adapting a total rate of a reducing agent storage via a storage adaptation rate generated from subtraction of the reducing agent release amount from the adaptation signal, conversion of a reducing agent concentration into a mass throughput, and division by the maximum storage capacity and a sign reversal, where the adaptation signal is based on the first and second NOx sensors, and adjusting an engine actuator in response to the stored amount of reducing agents, the reducing agent release amount, or the total rate of reducing agent storage.

In some examples, the system further comprises additional controller instructions for detecting a rate of thermal stability of the SCR catalytic converter and setting the storage adaptation rate equal to zero for large temperature gradients. The system also further comprises additional controller instructions for diagnosing the exhaust system when a value of a storage adaptation is below a threshold level. The system also includes where the controller includes additional instructions for a one-dimensional model with a plurality of cells in an axial direction provided to simulate the SCR catalytic converter, wherein the adaptation signal is applied to a final cell and wherein a remainder of the adaptation signal runs over in a stepped fashion to the next cells situated upstream of the final cell. The system also includes where the controller includes additional instructions for calculating a NOx adaptation signal via subtraction of an estimated NOx concentration downstream of the SCR catalytic converter from a NOx concentration downstream of the SCR catalytic converter and where a NOx release in exhaust gas is calculated via the NOx adaptation signal and where an adaptation rate of NOx conversion is calculated via the NOx adaptation signal and where an adaptation factor for NOx conversion is calculated via the adaptation rate of the NOx conversion and where an adaptation factor for NOx conversion is supplied to the kinetic model of the SCR catalytic converter.

In still other examples, the system further comprises additional controller instructions for a one-dimensional model with a plurality of cells in the axial direction provided to model the SCR catalytic converter, where a NOx adaptation signal is applied to a first cell and where a remainder of the NOx adaptation signal runs over in a stepped fashion to next cells situated downstream of the first cell. In this way, operation of the SCR catalytic converter is included in the adaptation of NOx and ammonia control parameters.

As will be appreciated by one of ordinary skill in the art, routines described in FIGS. 1 and 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for adapting an SCR catalytic converter for a vehicle exhaust system, comprising:
supplying an adaptation signal to a kinetic model and adapting an amount of stored reducing agents via the adaptation signal, adapting a reducing agent release amount via a remainder of the adaptation signal, and adapting a total rate of a reducing agent storage via a storage adaptation rate generated from subtraction of the reducing agent release amount from the adaptation signal, conversion of a reducing agent concentration into a mass throughput, and division by the maximum storage capacity and a sign reversal; and
adjusting an engine actuator in response to the stored amount of reducing agents, the reducing agent release amount, or the total rate of reducing agent storage.

2. The method of claim 1, further comprising improving an estimation of a mass of stored reducing agents via a storage adaptation generated via integration of the storage adaptation rate and multiplication by a nominal total storage capacity.

3. The method of claim 1, where the engine actuator is an EGR valve.

4. The method of claim 3, further comprising increasing an opening amount of the EGR valve when the stored amount of reducing agent is less than a threshold amount.

5. The method of claim 1, where the engine actuator is a fuel injector.

6. The method of claim 5, further comprising where the start of fuel injection timing of the fuel injector is retarded when the stored amount of reducing agents is less than a threshold amount.

7. A method for adapting an SCR catalytic converter for a vehicle exhaust system, comprising:
determining an amount of nitrogen oxides upstream of the SCR catalytic converter;
calculating an amount of reducing agent stored in the SCR catalytic converter and a NOx concentration downstream of the SCR catalyst and a reducing agent concentration downstream of the SCR catalytic converter via a kinetic model of the SCR catalytic converter;
determining a reducing agent concentration downstream of the SCR catalytic converter;
calculating a limit function on the basis of the reducing agent concentration downstream of the SCR catalytic converter and the amount of nitrogen oxides upstream of the SCR catalytic converter;
calculating an adaptation signal via subtraction of the reducing agent concentration downstream of the SCR catalytic converter from the limit function;
supplying the adaptation signal to the kinetic model and adapting the amount of reducing agent stored in the SCR catalytic converter via the adaptation signal, and adapting a reducing agent release via a remainder of the adaptation signal, and adapting a total rate of the reducing agent storage in the SCR catalytic converter via a storage adaptation rate generated from subtraction of the reducing agent release from the adaptation signal, conversion of a reducing agent concentration into a mass throughput, division by a maximum storage capacity and a sign reversal, and improving an estimation of a mass of stored reducing agents via a storage adaptation generated by integration of the storage adaptation rate, generation of a factor therefrom, and multiplication of a nominal total storage capacity.

8. The method of claim 7, where the amount of nitrogen oxides upstream of the SCR catalytic converter is determined using an estimation model or a sensor arranged upstream of the SCR catalytic converter.

9. The method of claim 7, where the NOx concentration downstream of the SCR catalytic converter and the reducing agent concentration downstream of the SCR catalytic converter are subjected to a time delay and filtered with a low-pass filter.

10. The method of claim 7, where the reducing agent concentration downstream of the SCR catalytic converter is measured via a NOx sensor downstream of the SCR catalytic converter and a NOx sensor upstream of the SCR catalytic converter.

11. The method of claim 7, where the limit function has a minimum limit and a maximum limit.

12. The method of claim 7, where the adaptation signal is calculated when the reducing agent concentration downstream of the SCR catalytic converter lies outside the limit function, and wherein the adaptation signal is set equal to zero when the reducing agent concentration downstream of the SCR catalytic converter lies within the limit function.

13. The method of claim 7, where the adaptation signal is corrected with regard to a wall temperature and a lambda value of an engine exhaust gas.

14. The method of claim 7, where a rate of thermal stability of the SCR catalytic converter is detected and the storage adaptation rate is set equal to zero for large temperature gradients.

15. A system for adapting a SCR catalytic converter for a vehicle exhaust system, comprising:
an engine;
an exhaust system coupled to the engine, the exhaust system including a SCR catalytic converter;
a first NOx sensor positioned upstream of the SCR catalytic converter;
a second NOx sensor positioned downstream of the SCR catalytic converter; and a controller including instructions for supplying an adaptation signal to a kinetic model and adapting an amount of stored reducing agents via the adaptation signal, adapting a reducing agent release amount via a remainder of the adaptation signal, and adapting a total rate of a reducing agent storage via a storage adaptation rate generated from subtraction of the reducing agent release amount from the adaptation signal, conversion of a reducing agent concentration into a mass throughput, and division by the maximum storage capacity and a sign reversal, where the adaptation signal is based on the first and second NOx sensors, and adjusting an engine actuator in response to the stored amount of reducing agents, the reducing agent release amount, or the total rate of reducing agent storage.

16. The system of claim 15, further comprising additional controller instructions for detecting a rate of thermal stability of the SCR catalytic converter and setting the storage adaptation rate equal to zero for large temperature gradients.

17. The system of claim 15, further comprising additional controller instructions for diagnosing the exhaust system when a value of a storage adaptation is below a threshold level.

18. The system of claim 15, where the controller includes additional instructions for a one-dimensional model with a plurality of cells in an axial direction provided to simulate the SCR catalytic converter, wherein the adaptation signal is applied to a final cell and wherein a remainder of the adaptation signal runs over in a stepped fashion to the next cells situated upstream of the final cell.

19. The system of claim 15, where the controller includes additional instructions for calculating a NOx adaptation signal via subtraction of an estimated NOx concentration downstream of the SCR catalytic converter from a NOx concentration downstream of the SCR catalytic converter and where a NOx release in exhaust gas is calculated via the NOx adaptation signal and where an adaptation rate of NOx conversion is calculated via the NOx adaptation signal and where an adaptation factor for NOx conversion is calculated via the adaptation rate of the NOx conversion and where an adaptation factor for NOx conversion is supplied to the kinetic model of the SCR catalytic converter.

20. The system of claim 15, further comprising additional controller instructions for a one-dimensional model with a plurality of cells in the axial direction provided to model the SCR catalytic converter, where a NOx adaptation signal is applied to a first cell and where a remainder of the NOx adaptation signal runs over in a stepped fashion to next cells situated downstream of the first cell.

* * * * *